United States Patent [19]

Valukis

[11] 4,180,239

[45] Dec. 25, 1979

[54] METERING VALVES

[75] Inventor: Robert W. Valukis, Sherborn, Mass.

[73] Assignee: Electron Fusion Devices Inc., East Providence, R.I.

[21] Appl. No.: 958,137

[22] Filed: Nov. 6, 1978

Related U.S. Application Data

[63] Continuation of Ser. No. 805,799, Jun. 13, 1977, abandoned.

[51] Int. Cl.² .................. F16K 31/122; F16K 1/52
[52] U.S. Cl. .................................... 251/60; 251/63.5; 251/331; 251/335 A; 251/205
[58] Field of Search ............... 251/61.5, 63.5, 335 A, 251/60, 331, 205

[56] References Cited

U.S. PATENT DOCUMENTS

| 402,896 | 5/1889 | Braggins | 251/61.3 |
|---|---|---|---|
| 1,053,315 | 2/1913 | O'Dowd | 251/61.5 |
| 1,939,150 | 12/1933 | Terry | 251/61.3 |
| 2,506,837 | 5/1950 | Kochner | 251/335 A |
| 2,675,204 | 4/1954 | Johnson | 251/335 A |
| 3,391,897 | 7/1968 | Wilson | 251/26 |
| 3,512,550 | 5/1970 | Ammann | 251/61.5 X |
| 3,844,307 | 10/1974 | Soury et al. | 251/61.5 X |

FOREIGN PATENT DOCUMENTS

| 1014806 | 8/1957 | Fed. Rep. of Germany | 251/335 A |
| 910339 | 11/1962 | United Kingdom | 251/63.5 |

Primary Examiner—Arnold Rosenthal

[57] ABSTRACT

A metering valve having a valving element with a valving surface; a valve head with a valve seat, an inlet passage upstream of the valving surface and an outlet passage downstream of the valving surface; a valve body which provides a predetermined small movement of the vaiving surface into and out of contact with the valve seat to dispense fluid, and biases the valving surface against the valve seat when fluid is not being dispensed; and a seal between the valving element and the valve head, the seal defining a dispensed fluid cavity around the valving surface and valve seat communicating with the inlet and outlet passages, and including a diaphragm in the preferred embodiment.

2 Claims, 5 Drawing Figures

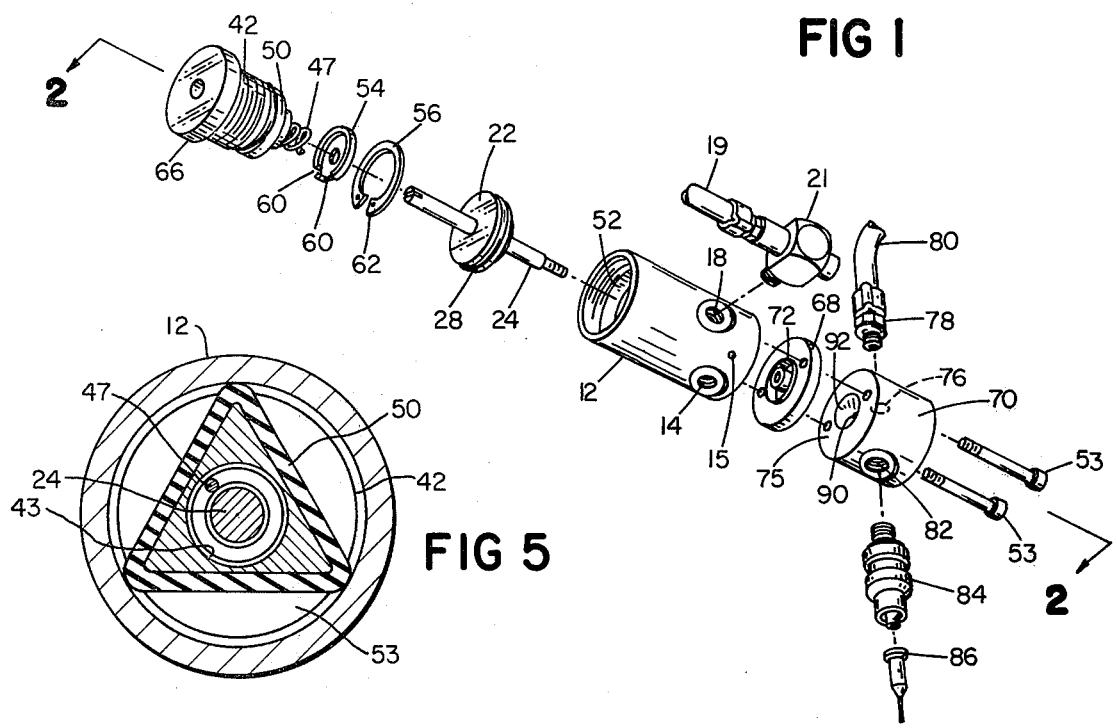
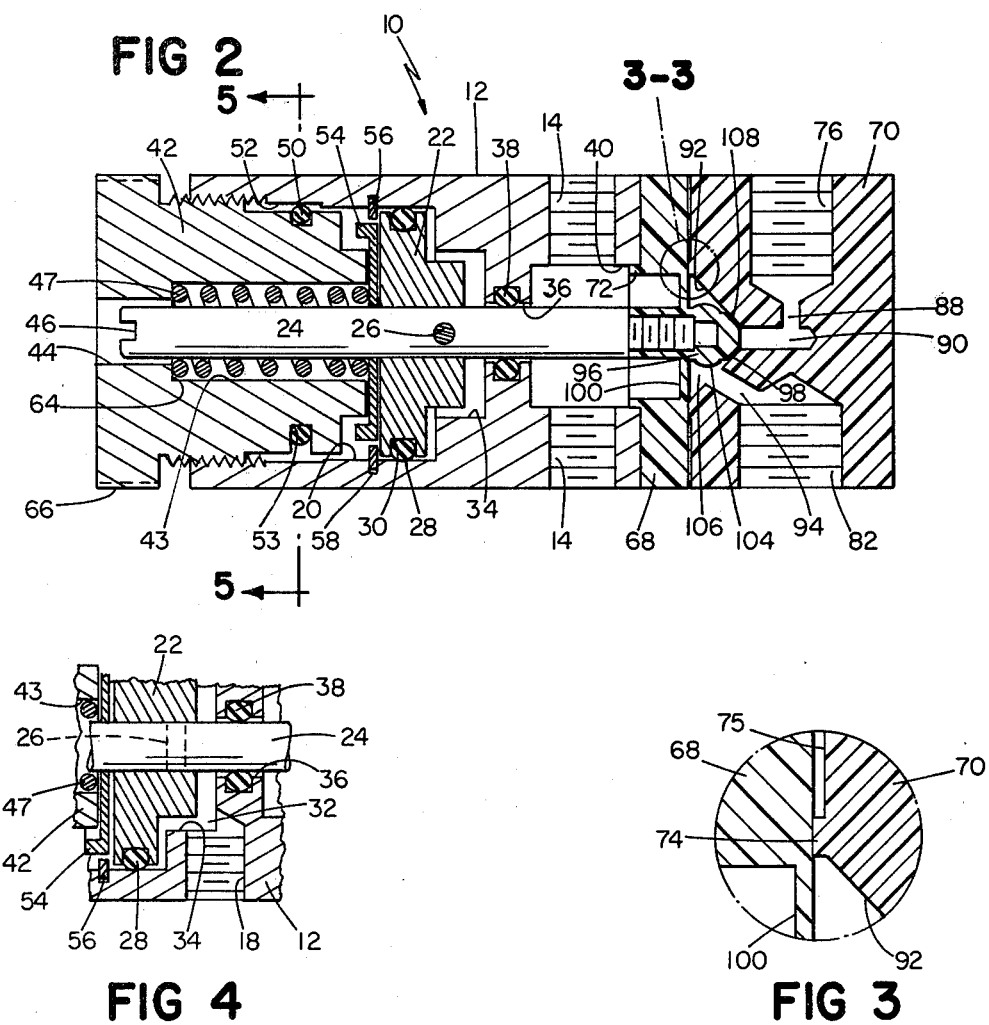

METERING VALVES

This is a continuation of application Ser. No. 805,799, filed June 13, 1977 and now abandoned.

FIELD OF THE INVENTION

This invention relates to precision fluid-metering valves.

BACKGROUND OF THE INVENTION

Precision fluid-metering valves are needed for many applications in which a precise volume of fluid must be rapidly and repetitively dispensed automatically. For example, in microdot dispensing applications manufacturers have sought a valve which could repetitively dispense 2 nanoliters, and at a rate of more than 100,000 times a day. Such a valve should be capable of turning on and shutting off in extremely small time intervals while also opening a sufficiently large flow passage to allow the desired flow. And, at the other extreme, bottle filling operations may require volumetric filling accuracies of 1% at rapid fill rates.

SUMMARY OF THE INVENTION

I have discovered that a precision fluid-metering valve capable of extremely fast turn-on and turn-off times can be constructed by providing a valve head with a valve seat, an inlet hole and an outlet hole; a valving element with a valving surface which mates with the valve seat; a seal between the valving element and the valve head; and a valve body which supports the valving element, and biases the valving surface against the valve seat. The inlet hole is located upstream and the outlet hole downstream of the valving surface. The seal cooperates with the valving element and the valve head to form a dispensed fluid cavity around the valving surface and valve seat. Both inlet and outlet holes communicate with the cavity. Fluid is dispensed by moving the valving surface a small distance from the valve seat.

In the preferred embodiment, the valve seat and valving surface lie on matching and concentric frustoconical annuli; the inlet hole is coaxial with the valve seat, and the outlet hole at a point further down the frustoconical valve seat, downstream of the valving surface; and a thin annular diaphragm integral with one portion of the valving element lies between the valving element and the valve head.

This valve design allows a relatively large flow cross-section to be formed for only a small piston stroke, enhancing the speed with which the valve can be fully opened and closed. Further, in the preferred embodiment, only two parts contact the fluid—the valve head and the valving element with its integral diaphragm. And only the valving element moves, all contributing to reduce wear, and increased life and reliability. Further advantages include east of disassembly for cleaning (without disturbing metering adjustments), enhanced fluid compatibility (only one material contacts the fluid), versatility of application (microdot dispensing to volumetric filling with the same valve), improved metering accuracy, and insensitivity to spatial orientation and vibration.

DESCRIPTION OF PREFERRED EMBODIMENT

The structure and operation of a preferred embodiment of the invention is as follows.

STRUCTURE

The drawings show the preferred embodiment, then described.

DRAWINGS

FIG. 1 is an isometric exploded view of said embodiment.

FIG. 2 is a partial cross-sectional assembled view taken through FIG. 1 at 2—2.

FIG. 3 is an enlarged view of a portion of FIG. 2.

FIG. 4 is a partial cross-sectional view taken through FIG. 1 at 90° to the view of FIG. 2, and showing an air hole not shown in FIG. 2.

FIG. 5 is a cross sectional view taken at 5—5 of FIG. 2.

DESCRIPTION

Turning now to the Figures, there is shown a precision fluid-metering valve 10. It includes an aluminum valve body 12 with two coaxial mounting holes 14, a threaded air hole 18 (shown in FIGS. 1 and 4), and two leakage holes 15 (one not shown) spaced between the mounting and air holes.

A source (not shown) of pulsed, pressurized air of at least 60 psi is connected through air input tube 19 to "Super" quick exhaust valve 21 (Humphrey Products, Kalamazoo, Mich.) which is mounted in air hole 18. The body has interior bore 20 which receives stainless steel piston 22 and rod 24, the two being fastened together by pin 26. O-ring 28, located in annular groove 30, makes an annular seal between the piston and cylinder bore 20. Air hole 18 communicates with the cylinder interior at passage 32 along a smaller cylinder bore 34. Rod 24 passes through still smaller bore 36, and O-ring 38 makes an annular seal between the rod and the cylinder bore. Mounting holes 14 and leakage holes 15 communicate with bore 40.

The other end of rod 24 extends through aluminum adjustment plug 42, making a loose fit within hole 44 in the plug. Slot 46 in the end of rod 24 is accessible through hole 44. Coil spring 47 surrounds rod 24, and fits in the annulus formed between the rod and bore 43 in the adjustment plug. The plug is threadedly received in the cylinder body interior, and sealed by O-ring 50 along bore 52, which is slightly larger than cylinder bore 20. Groove 53, into which O-ring 50 fits, is specially cut deeper along three segments to form a delta-shape groove, to which shape the O-ring 50 is thus deformed. This arrangement retards the plug from backing out under vibrations caused by rapid piston cycling. Anti-torque washer 54 separates the piston and adjustment plug. It is aligned with retaining ring 56, located in interior groove 58 in cylinder bore 20. Two notches 60 in the washer are aligned with two tabs 62 of the retaining ring, preventing rotation of the washer. Spring 47 is compressed between shoulder 64 and washer 54. Knurled surface 66 on the adjustment plug facilitates hand adjustment.

Attached to the other end of the cylinder body by cap screws 53 are diaphragm element 68 and valve head 70. Both are machined from ultra high molecular weight (UHMW) polyethylene, and have outside diameters which match the cylinder body. Annular lip 72 on the diaphragm element fits inside cylinder bore 40, aligning the disk and valve head with the cylinder body. Integral annular gasket 74 (best shown in FIG. 3), 0.005 in. thick and 0.050 in. wide, on inside surface 75 of valve head 70, forms the pressure seal between the diaphragm element and valve head. Inlet hole 76 in the valve head threadedly receives a conventional barb fitting 78 to which input tubing 80 is attached. An outlet hole 82, coaxial with the inlet hole, threadedly receives Leur Lock needle adapter 84 to which a Leur Lock needle 86 is secured. Inlet passages 88 and 90 (both 0.062 in. diameter) port the incoming fluid to an entrance where passage 90 intersects frustoconical surface 92. Outlet passage 94 (0.062 in. diameter) ports the outgoing fluid from an exit where passage 94 intersects frustoconical surface 92 to the outlet hole 82. Surface 92 forms a valve seat.

Sealing plug 96, protruding from diaphragm element 68, seals the entrance to input passage 90 when its frustoconical end 98 mates with surface 92. The plug is carried by thin integral annular diaphragm 100 (0.017 in. thick, 0.38 in. O.D., 0.16 in. I.D.), formed by machining an annular bore in diaphragm element 68. The plug threadedly receives one end of rod 24. The combination of piston, rod, diaphragm element, and plug forms a valving element. Barrel-shaped bulge 104 in the plug gives added strength. A dispensed fluid cavity 106 is defined by frustoconical surface 92 and diaphragm 100.

OPERATION

In operation, the source (not shown) of pulsed, pressurized air, connected through tube 19 and quick exhaust valve 21 to air hole 18, forces piston 22 to move toward adjustment plug 42. Piston movement is stopped by anti-torque washer 54 and adjustment plug 42. Rotation of plug 42 adjusts the piston movement from 0 up to 0.010 in. The retaining ring limits travel to 0.010 in., preventing damage to the delicate element 68 in the event that the adjustment plug has been backed out too far. The small piston movement opens an annular flow cross-section 108, which, for little piston motion, has good flow capacity. Fluid flows through fluid cavity 106, out through output passage 94, and out of needle 86. When the pulse of pressurized air begins to decay, the quick exhaust valve rapidly dumps the air within the cylinder body, the piston and sealing plug rapidly move, biased by spring 47, to their closed rest positions, and flow stops abruptly.

The amount of fluid metered by the valve is a function of the input fluid pressure, the piston and sealing plug movement, the time the valve remains open, and the needle or other output orifice size. All these are readily adjustable, allowing the valve to meter fluid volumes varying from 2 nanoliters to 1 liter or more. Input fluid pressure will typically range from 1 to 5 psi for low viscosity fluids, and 10 to 20 psi for medium viscosity fluids. As much as 80 psi may be applied. For microdot deposits, fluid pressures between 0.5 and 1 psi and piston strokes near zero should be maintained. By applying a vacuum to the fluid input, the valve can be operated as a precision vacuum syringe.

Cleaning of the valve head and diaphragm disk may be accomplished without altering the stroke adjustment by simply removing the two cap screws 53. Alternatively, purge cleaning may be performed without any disassembly.

The ultra high molecular weight (UHMW) polyethylene from which both diaphragm element 68 and valve head 70 are machined does not cold flow, as would Teflon, for example. Furthermore, it has Federal Drug Administration approval for food processing, is highly resistant to organic and inorganic reagents and exhibits long life and stability. Diaphragm 100 has a sufficiently large annular area and is thin enough to permit the 0.010 in. deflection while maintaining adequate strength to achieve a long service life. In the unlikely occurrence of diaphragm rupture, fluid will escape through leakage holes 15 without contaminating the functioning interior of the cylinder body.

The valve may be successfully installed in any spatial orientation, and multiple valves may be driven in unison. The extreme fine tuning achievable with adjustment plug 42 facilitates the necessary synchronization.

OTHER EMBODIMENTS

Other embodiments are within the scope of the invention and claims. For example, the seal could be of a different character, and the UHMW polymer parts could be made from stainless steel.

What is claimed is:
1. A metering valve comprising
a fluid passage member,
  said fluid passage member comprising
    a fluid inlet passage,
    a conical valve seat portion, and
    a fluid outlet passage,
      said conical valve seat portion being intermediate said fluid inlet passage and said fluid outlet passage,
a valving element,
  said valving element comprising
    an outer annular portion,
    an inner annular portion,
    a conical valving surface, and
    drive rod connection means,
      said inner annular portion being integral and coaxial with said outer annular portion and said conical valving surface and flexible to permit movement axially of said conical valving surface longitudinally into and out of engagement with said conical valve seat portion,
a piston,
a drive rod,
a valve body,
  said valve body comprising
    an abutment surface for abutting said valving element around said outer annular portion,
    a relieved portion adapted to sealingly permit longitudinal reciprocation therein of said drive rod,
    an inner cylindrical surface to sealingly permit longitudinal reciprocating of said piston, and
    a screw-threaded portion at its end longitudinally spaced from said abutment surface,
a plug screw-threadedly engaging said screw-threaded portion,
  said drive rod being secured at one end in said drive rod connection means and being secured intermediately to said piston for reciprocation therewith,
biasing means engaging said plug to bias said drive rod toward said valve body, and
a vibration element comprising a frictional element engaging said plug around an outer diameter thereof and said valve body at discontinuous spaced locations around an inner diameter thereof,
  said fluid passage member, valving element, and valve body being secured in longitudinal and abutting relationship,
whereby said plug may be adjusted like a micrometer to provide delicately controlled valving surface stroke within a small range permitted by the flexibility of said inner annular portion of said valving element.

2. The metering valve of claim 1 which includes first means carried by said valve body and second means carried by said piston
said first means and said second means cooperating to limit rotation of said piston.

* * * * *